(12) United States Patent
Yamada (10) Patent No.: US 7,653,384 B2
(45) Date of Patent: Jan. 26, 2010

(54) REMOTE SERVICE SYSTEM FOR A VEHICLE

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 524 days.

(21) Appl. No.: 11/732,473

(22) Filed: Apr. 3, 2007

(65) Prior Publication Data

US 2007/0287415 A1 Dec. 13, 2007

(30) Foreign Application Priority Data

Apr. 6, 2006 (JP) ............................. 2006-105317

(51) Int. Cl.
*H04M 3/00* (2006.01)
(52) U.S. Cl. .......................... 455/419; 701/29; 701/33
(58) Field of Classification Search .................. 455/418, 455/419, 550.1, 556.1; 701/1
See application file for complete search history.

(56) References Cited

U.S. PATENT DOCUMENTS

| | | | | |
|---|---|---|---|---|
| 6,330,499 | B1 * | 12/2001 | Chou et al. ................... | 701/33 |
| 6,339,736 | B1 * | 1/2002 | Moskowitz et al. .......... | 701/29 |
| 6,405,033 | B1 * | 6/2002 | Kennedy et al. .......... | 455/414.1 |
| 2007/0005201 | A1 * | 1/2007 | Chenn ........................ | 701/29 |

FOREIGN PATENT DOCUMENTS

| | | |
|---|---|---|
| JP | 11-191804 | 7/1999 |
| JP | 2000-197114 | 7/2000 |
| JP | 2002-228554 | 8/2002 |
| JP | 2004-147111 | 5/2004 |
| JP | 2004-317447 | 11/2004 |
| JP | 2005-025037 | 1/2005 |
| JP | 2005-251131 | 9/2005 |

* cited by examiner

*Primary Examiner*—Kent Chang
*Assistant Examiner*—Dinh P Nguyen
(74) *Attorney, Agent, or Firm*—Harness, Dickey & Pierce, PLC (57) ABSTRACT

A control unit of a remote service terminal, for which a contract for using services is still valid, compares data of a vehicle inspection certificate with data in a user database to detect if an owner of a vehicle has changed. When the owner has changed, the control unit notifies the change of data to a management center through a cellular communication unit. The management center retrieves a contractor database based on the notified content to confirm if the owner of the vehicle has changed. When the owner change is confirmed, processing is executed through the remote service terminal to inquire if the contract for using services is canceled or the name of the contractor is changed. The contract is cancelled or the name of the contractor is changed based on a response by the user.

4 Claims, 7 Drawing Sheets

REMOTE SERVICE SYSTEM FOR A VEHICLE

CROSS REFERENCE TO RELATED APPLICATION

This application is based on and incorporates herein by reference Japanese Patent Application No. 2006-105317 filed on Apr. 6, 2006.

FIELD OF THE INVENTION

This invention relates to a remote service system for a vehicle using, as a client, a remote service terminal mounted on a vehicle.

In recent years, various remote service systems for vehicles are proposed (for example, JP 2004-317447A and JP 2005-25037A) and placed in practical use. Those are called G-BOOK and G-BOOK ALPHA (both of which are registered trademarks), and telematics systems for offering remote services such as a function for offering facility data and map data being linked to a vehicle navigation system, an amusement function for delivering music and pictures, an emergency informing function in case an accident occurs or a passenger gets sick suddenly, a vehicle position tracing function for transmitting the present position of the vehicle to a personal computer or to a cell phone and an electronic settling function. The users who wish to utilize such systems make an application through agents such as vehicle dealers to make a contract for utilizing the services.

To sell off a vehicle for which a contract of using the above remote service systems for the vehicle is still valid, however, the old user must take a procedure to cancel the contract of use. In practice, however, it often happens that the user sells off the vehicle forgetting to take such a procedure for cancellation. Therefore, various problems may occur. Let, for example, a cell phone be presumed here. If the user leaves a cell phone without canceling the contract, the utilization fee builds up every month. Therefore, the user must surely take a procedure for cancellation if he wishes to cancel the contract. Besides, it is not likely that the cell phone is resoled so that once the user cancels the contract, no problem occurs thereafter. When it comes to a vehicle, however, chances are that the vehicle is in many cases resold and that the route of sale is not only through a vehicle dealer but very often through used vehicle sales shops. Under such circumstances, it is relatively highly probable that the cancellation of remote service systems is often neglected, accompanied by the occurrence of various problems.

Specifically, if a vehicle is sold off without canceling a contract of using remote services, the new user who has purchased the vehicle as a used vehicle is allowed to utilize the services contracted by an old user (allowed to use services at least until the term of contract expires or for further extended periods in case the term of contract is automatically renewed). Therefore, if a new user uses the services that incur charges, money trouble may occur between the new user and the old user. Besides, the old user is still in a position to receive information concerning the present position of the vehicle owing to the vehicle position tracing function encroaching the privacy of the new user and jeopardizing the security causing the new user to suffer great disadvantage, which may become a very serious trouble.

SUMMARY OF THE INVENTION

The present invention has an object of providing a remote service system for a vehicle, which prevents in advance the occurrence of troubles that stem from resale of a vehicle having a remote service terminal for which a contract for using services is still valid.

According to a first aspect of the invention, if an owner of a vehicle having a remote service terminal with a contract of utilizing services still valid, may have changed, this state is detected at a remote service terminal and detected content is notified to a management center. The management center that receives the notice makes sure the change of the owner of the vehicle by retrieving a contractor database accumulating data related to using remote services contracted by the user relying upon the detected content that is notified. When it is confirmed that the owner of the vehicle has changed, the management center executes processing for canceling the contact of using services through the remote service terminal or for inquiring if the contractor has changed.

In this case, the user of the remote service terminal, i.e., a new user who newly owns the vehicle responds to the management center so as to cancel the contract of using services or to change the contractor (change the name of the contractor or to newly make a contract) in response to the inquiry through the remote service terminal. This response can be done by utilizing a communication function of the remote service terminal or by utilizing any other communication means (e-mail, postal mail, etc.). The management center that receives the above response executes, based on the content of response, processing for canceling the contract of using services or for changing the name of the contractor.

Namely, if the vehicle having the remote service terminal with the contracting of using service still valid is sold out without taking a procedure of canceling the contract for using services, the management center makes sure the will of the new user of the vehicle concerning if he wishes to cancel or continue the contract for using services. Depending upon the result of having confirmed the will, the contract for using services is canceled or the name of the contractor is changed. Therefore, the new user is not likely to suffer disadvantage caused by the remote services contracted by the old user making it possible to prevent in advance the occurrence of troubles caused by the resale of the vehicle having the remote service terminal with the contract of using services still valid.

According to another aspect of the invention, if an owner of a vehicle having a remote service terminal with a contract of using services still valid, may have changed, this state is detected at a remote service terminal, and specific data for specifying the remote service terminal are notified to a management center. The management center that receives the notice specifies the user who has made the contract of using services related to the remote service terminal by retrieving a contractor database accumulating data related to using remote services contracted by the user relying upon the specific data. The management center, further, executes processing for inquiring the contracted user if there is a change in the content of contract for using remote services for the vehicle.

In this case, the contracted user who receives the inquiry makes sure the change in the contract for using services (e.g., cancellation of contract, change of address of the contractor) in compliance with the inquiry, and responds to the management center so as to cancel the contract or change the content of the contract (e.g., address of the person who has contracted). The management center that receives the above response executes processing for canceling or changing the contract for using services relying upon the content of response.

Namely, if the vehicle having the remote service terminal with the contract of using services still valid is sold out without taking a procedure of canceling the contract for using services, the management center specifies the user who has made the contract for using services based on the specific data with which the remote service terminal can be specified, and makes sure the contracted user if he wishes to cancel the contract of using services or simply changes the content of the contract. Depending upon the result of confirmation, the contract of using services is canceled or is changed. Therefore, the new user who newly owns the vehicle is prevented from using remote services of the old contract made by the old user (above contracted user) making it possible to prevent in advance the occurrence of troubles between the new user and the old user arising from the resale of the vehicle having the remote service terminal with the contract of using services still valid.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS

First Embodiment

Figure 1:
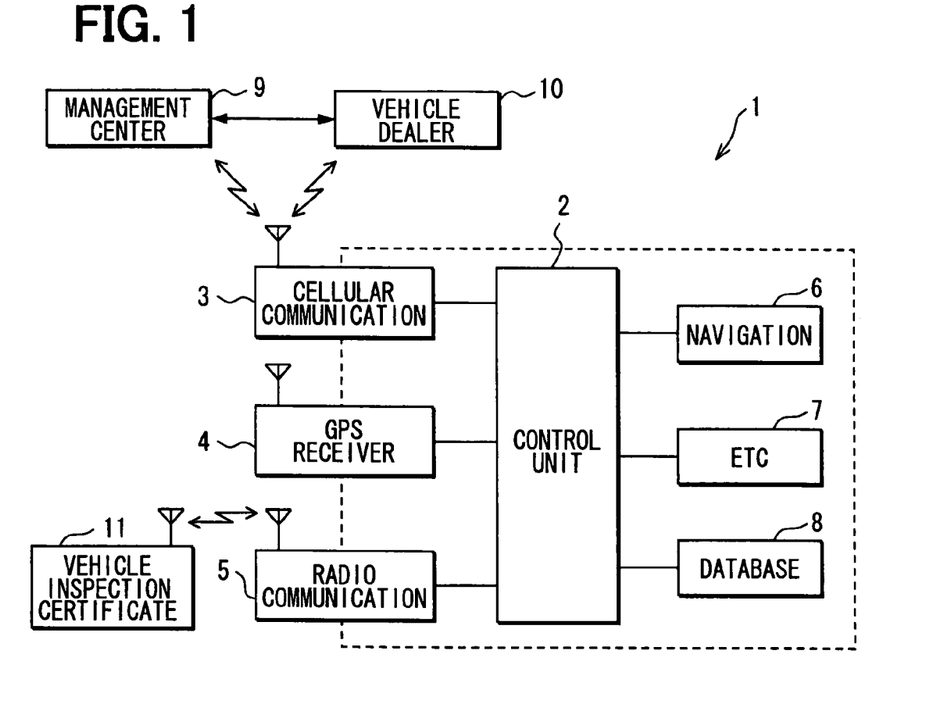
FIG. 1 is a schematic diagram showing a remote service system according to a first embodiment of the present invention.

Referring first to FIG. 1, a remote service terminal 1 is mounted on a vehicle as a vehicle-mounted device, which is a client of a remote service system for a vehicle. The remote service terminal 1 includes an electronic control unit 2, a cellular communication unit 3, a GPS receiver unit 4, a radio communication unit 5, a vehicle navigation unit 6, an ETC (electronic toll collection) unit 7 and a user database 8. The control unit 2 has a microcomputer for controlling the entire operation of the terminal. The remote service terminal 1 has a contract with a business body of the remote service system for the vehicle for using services, and are initially so set as to be allowed to use remote services based on the contract of use.

The cellular communication unit 3 includes a dedicated data communication module (DCM) and a cell phone, communicates data with a management center 9 which is a core of the remote service system for the vehicle through the DCM, and communicates, through the cell phone, the data and voice codes with a vehicle dealer 10 (usually, a selling agency of a vehicle) that has took the procedure of making a contract for remote services. The management center 9 and the vehicle dealer 10 are capable of communicating data with each other.

The GPS receiver unit 4 receives signals from artificial satellites for GPS and applies the received GPS signals to the control unit 2 as position data representing the present position of the vehicle.

The radio communication unit 5 is for reading data of a vehicle inspection certificate 11 (data including at least vehicle registration number, address and name of a user (or owner)) from an FRID tag (not shown) incorporated therein storing the data of the vehicle inspection certificate in a form in compliance with the vehicle inspection certificate 11. The radio communication unit 5 includes a receiver circuit incorporating a demodulator circuit and a transmitter circuit incorporating a modulator circuit, and transmits ASK-modulated query signals to a predetermined communication area (at least inside a compartment) every time when a main switch (ignition switch) of the vehicle is turned on. Here, when the query signals are received, a radio frequency identification data tag (RFID tag) incorporated in the vehicle inspection certificate 11 answers back response signals (ASK-modulated signals) inclusive of the data of the vehicle inspection certificate, and the radio communication unit 5 demodulates the response signals that are answered back and sends them to the control unit 2. It has been obliged that the vehicle must carry the vehicle inspection certificate 11 at all times. Therefore, the radio communication unit 5 takes in the data of the vehicle inspection certificate 11 every time when the main switch of the vehicle is turned on.

The vehicle navigation unit 6 includes a monitor, a map database, an operation switch unit (in a concept of including touch panel switches on the monitor), and speakers (speakers of a vehicle-mounted audio system may be utilized). The control unit 2 executes navigation controls (map display control, route guidance control, etc.) through the vehicle navigation unit 6 based on the position data from the GPS receiver unit 4.

The ETC unit 7 includes a functional unit for processing the ETC data, a card insertion unit and an antenna, and sends to the control unit 2 the data that are set, card data read from an ETC card inserted in the card insertion unit and data processed by the process functional unit (accounting data, toll gate data, etc.). Based upon the above processed data, the control unit 2 forms ETC history data, and executes control to display, as required, the thus formed ETC history data on the monitor of the vehicle navigation unit 6.

The user database 8 is for storing the data of the vehicle inspection certificate 11 (data including at least the registered number, address and name of the user or owner) obtained from the vehicle inspection certificate 11. The user database 8 is a storage constituted by a non-volatile memory capable of rewriting the data, such as a flash memory. In a default state, the user database 8 does not store the data of the vehicle inspection certificate 11. After having made the contract for using remote services for the vehicle, however, the user database 8 records, as initial data, the data of the vehicle inspection certificate obtained from the vehicle inspection certificate 11 through the radio communication unit 5.

After having made the contract for using remote services for the vehicle, the control unit 2 communicates the data with the management center 9 to execute control processing related to a function for offering facility data and map data linked to the vehicle navigation unit 6, an amusement function for delivering music and pictures, an emergency information function in case an accident occurs or a passenger gets sick suddenly, a vehicle position-tracing function for transmitting the present position of the vehicle to a personal computer or a cell phone of the contractor and an electronic settling function.

Figure 2:
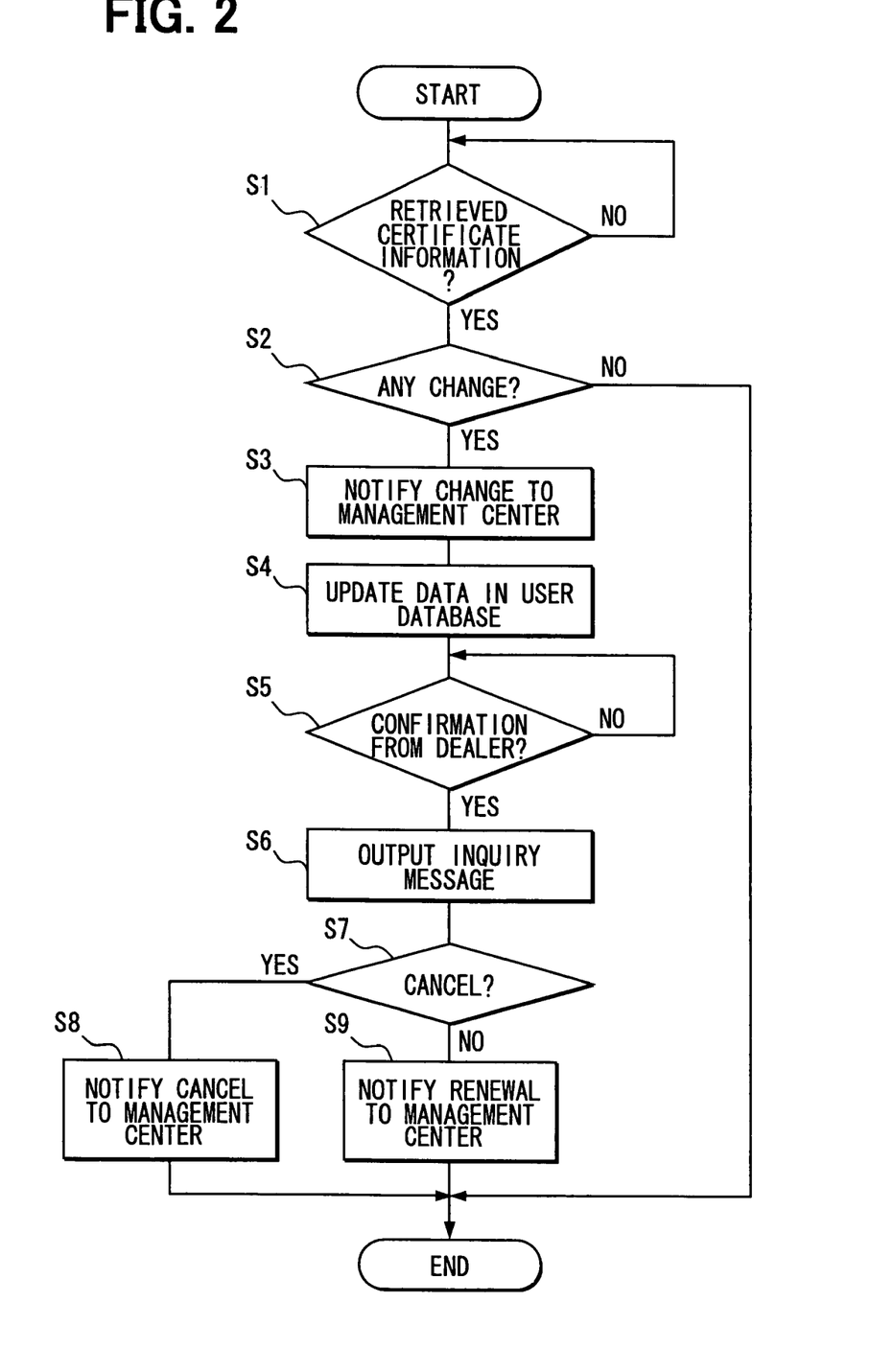
FIG. 2 is a flow diagram showing processing executed by a control unit of a remote service terminal in the first embodiment.

The control unit 2 is programmed to execute various processing, particularly contract condition confirmation processing shown in FIG. 2. This processing will now be described together with the contents of the related processing executed by the management center 9 and the vehicle dealer 10.

In this processing for confirming the condition of the contract, first, it is checked if the data of the vehicle inspection certificate (at least the registered number, address and name of the user or the owner) recorded in the RFID tag incorporated in the vehicle inspection certificate 11 are retrieved through the radio communication unit 5 (step S1). Next step S2 is executed only when the data of the vehicle inspection certificate are retrieved, i.e., only when response signals are returned from the RFID tag at timing when the main switch of the vehicle is turned on. The step S2 executes processing which corresponds to "state detection function for detecting a state where it is probable that an owner of a vehicle has changed." Specifically, the retrieved data of the vehicle inspection certificate are compared with the data of the vehicle inspection certificate stored in the user database 8 to check if there is a change in the newly retrieved data of the vehicle inspection certificate (particularly, address and name of the user or the owner). If, as a result of check, there is no change in the data of the vehicle inspection certificate (i.e., the owner of the vehicle has not been changed), the routine ends and returns to the initial state. If there is a change, however, a change in the data is notified to the management center 9 through the cellular communication unit 3 (step S3). Through the processing at step S3, the "communication function" is realized. Notice of change of the data to the management center 9 includes "registered numbers" and "addresses and names of the users or owners" in the data of the new and old vehicle inspection certificates (data of the vehicle inspection certificate stored in the user database 8 and newly retrieved data of the vehicle inspection certificate).

Upon receipt of the above notice of change in the data from the remote service terminal 1 on the side of the vehicle, the management center 9 executes processing for retrieving the contractor database (database accumulating the data of the contractors who have made contracts for using services) provided in the management center 9 (or in another facility that is accessible) based on the content of notifying the change of the data to confirm the change in the contracted content of the vehicle (particularly, change of the contractor), and for notifying the confirmed results to the vehicle dealer 10. The vehicle dealer 10 who has received the notice executes processing for storing or recording this fact in the database for managing the clients and for notifying the confirmed results to the remote service terminal 1 through the cellular communication unit 3.

After having executed the processing at step S3 of notifying the change of data, the control unit 2 updates the data of the vehicle inspection certificate in the user database up to the newly retrieved data (step S4) and, thereafter, stands by until the confirmed results are notified from the vehicle dealer 10 (step S5). In this standby state (state of execution at step S5), even when the main switch of the vehicle is turned off, the control unit 2 starts the processing for confirming the condition of the contract from step S5 when the main switch is turned on again.

When the confirmed results are notified from the vehicle dealer 10, an inquiry message is output to the user through, for example, the monitor and speaker of the vehicle navigation unit 6 to make sure if he wishes to update the contract for remote services for the vehicle (step S6). Upon receipt of the above message for confirmation, the user expresses his will to update the contract into the name of the new user to continuously use the remote services or to cancel the contract of the old user through the operation switch unit of the vehicle navigation unit 6.

The control unit 2 confirms the user's will based on the input through the operation switch unit (step S7). If the will for canceling the contract is confirmed, the control unit 2 executes step S8 for notifying the cancellation of contract to the management center 9 and returns to the initial state. If the will for renewing (continuing) the contract is confirmed and not canceled, the control unit 2 executes step S9 to notify the renewal of contract to the management center 9.

On the side of the management center 9 that receives the notice for canceling the contract and the notice for renewing the contract, the data of contract related to the vehicle in the contractor database are rewritten into a content corresponding to the received notice for canceling the contract or the notice for updating the contract, the content of contract related to the vehicle is determined, and the determined results are notified to the vehicle dealer 10.

The vehicle dealer 10, which receives the notice, executes processing for notifying the condition of the new contract related to the remote services for the vehicle (inclusive of data representing the updating or cancellation of the contract) to the remote service terminal 1 through the cellular communication unit 3. Although not shown in FIG. 2, the control unit 2 in the remote service terminal 1 that receives the above notice of the condition of the contract displays the condition of the contract on the monitor of the vehicle navigation unit 6. Even when the condition of the contract is notified, it is desired to mail a written contract to the address of the new contractor particularly when the contract is renewed. Further, when the notice of the condition of the contract is received, the vehicle dealer 10 notifies to the old user (former contractor) the fact that the former user's contract for using services has been cancelled by sending a written document in a postal mail or by an e-mail.

Figure 3:
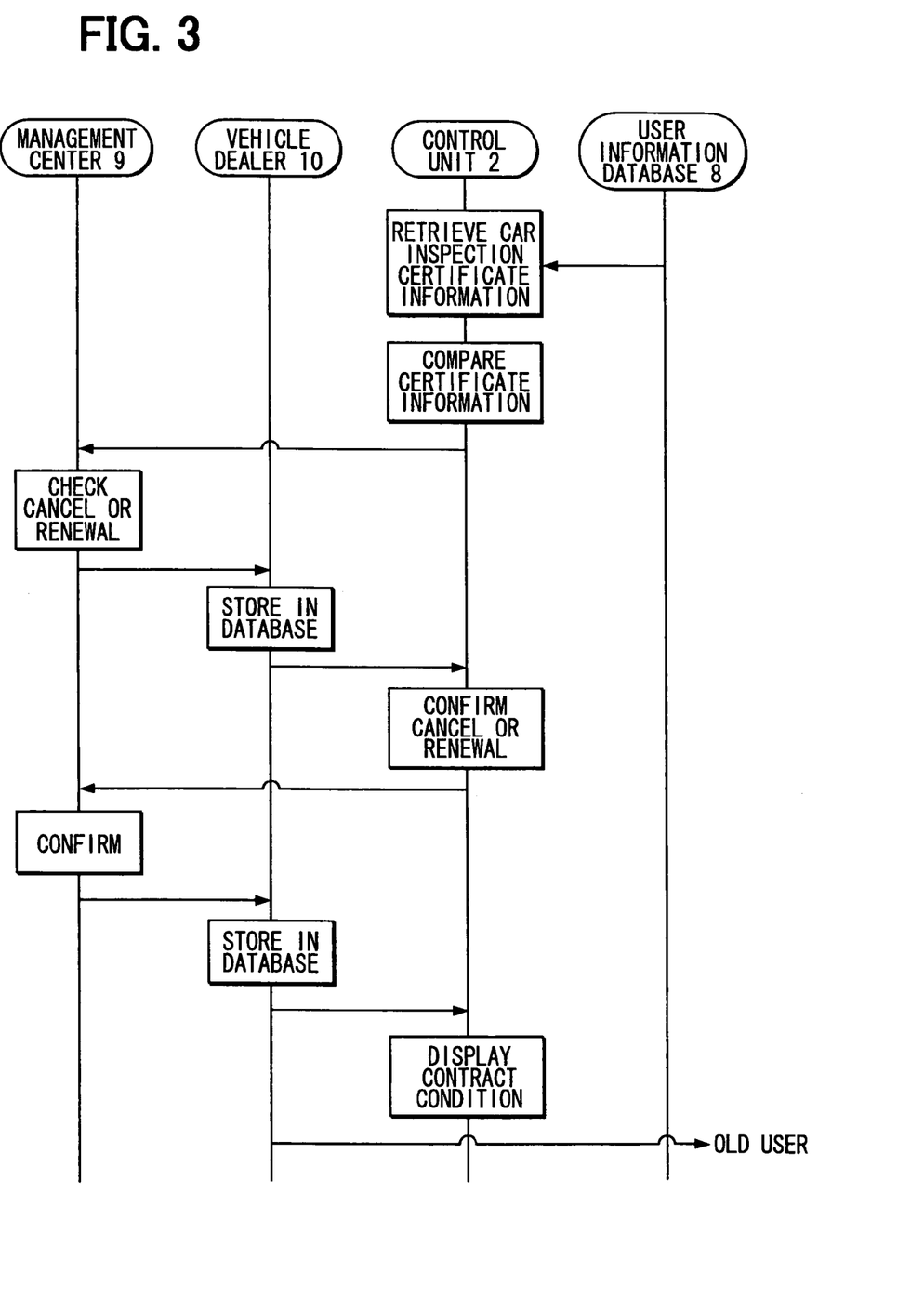
FIG. 3 is a sequence diagram showing flow of information among a management center, a vehicle dealer, a user information database and the remote service terminal in the first embodiment.

FIG. 3 is a sequence diagram illustrating the flow of data among the control unit 2, the user database 8, management center 9 and vehicle dealer 10 as well as the contents of processing in these units for assisting the comprehension of the content of the processing for confirming the condition of the contract.

According to this embodiment, if the owner of the vehicle with the contract of using remote service systems still valid sells off the vehicle without taking a procedure for canceling the contract, the processing is executed for confirming the condition of the contract as shown in FIG. 2 by utilizing the event that the data of the vehicle inspection certificate 11 are changed as a result of selling. That is, if the vehicle having the remote service terminal 1 of which the contract of using the service is still valid is sold off without taking a procedure for canceling the contract for using services, the management center 9 checks or confirms the new user of the vehicle if he wishes to cancel or renew the contract for utilizing the services. Depending upon the result of checking the will, the contract for using the services is cancelled or the name of the contracts is changed. Therefore, the new user does not suffer disadvantages arising from the remote services contracted by the old user. For instance, privacy of the new user is not encroached by the presence of the vehicle position-tracing function which is offered as a remote service, or the security is not jeopardized, making it possible to prevent in advance the occurrence of troubles due to resale of the vehicle having the remote service terminal 1 with the contract for using the services still valid.

According to the first embodiment, the old user (former contractor) is notified of the cancellation of the contract for using services made by the old user. Being notified as above, therefore, the old user can recognize the cancellation of the contract of remote services for the vehicle. This, further, prevents such an occurrence that the remote services are used without rewriting the old user's contract and, therefore, prevents the occurrence of a trouble (e.g., money trouble that arises from the use of services by the new user incurring charges) between the new user and the old user due to the resale of the vehicle having the remote service terminal 1 with the contract for using services still valid.

According to the first embodiment, cancellation of the contract of the remote services for the vehicles is notified to the old user by the vehicle dealer 10. The cancellation, however, may be notified from the management center 9. Specifically, when it is confirmed at the management center 9 that the owner of the vehicle has changed relying upon the data of the vehicle inspection certificate retrieved from the vehicle inspection certificate 11, the owner of the vehicle before the change is qualified as the old user based on the retrieval of the contractor database, cancellation of the contract for using services may be notified to the qualified old user, and processing may be executed to cancel the contract for using services.

Further, when the processing is executed to notify the cancellation of the contract for using services to the old user and when the processing is executed to cancel the contract for using the services, processing may be executed to inquire the old user if the contract of the remote services for the vehicle may be cancelled prior to executing the processing for canceling the contract of using services, and the processing may be executed to cancel the contract of using services only when the old user agrees with canceling the contract in compliance with the inquiry.

When the above processing is employed, the consent of the owner of the vehicle qualified as the old user is necessary for canceling the contract of using the services. Therefore, the contract of using the services is not unintentionally cancelled by erroneous processing for qualifying the old user. Such an error could occur in case the change of the owner of the vehicle is erroneously confirmed based on the vehicle inspection certificate 11.

Second Embodiment

Figure 4:
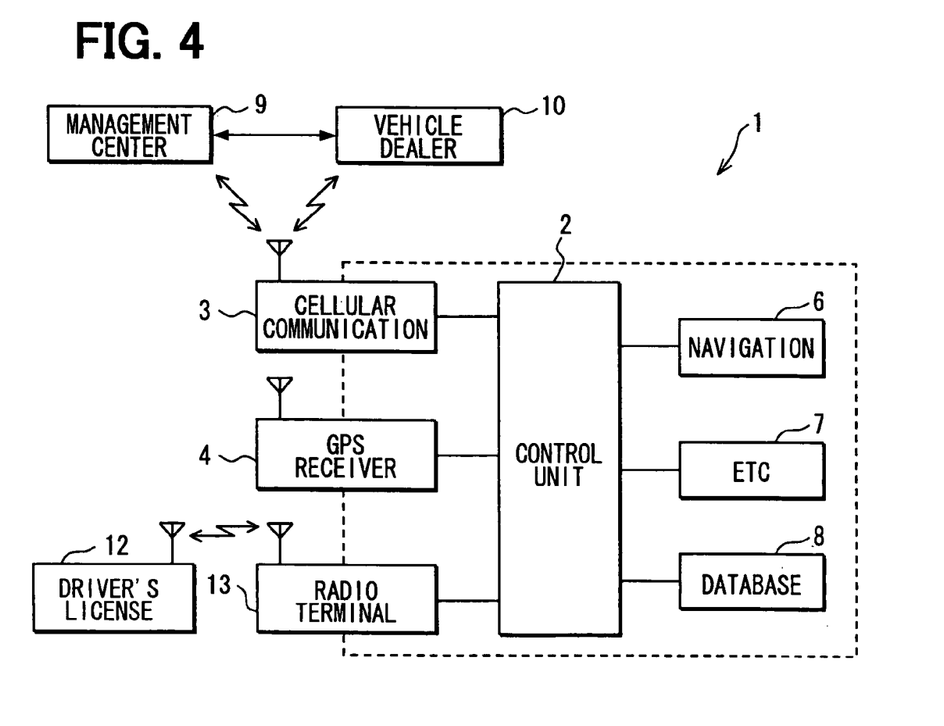
FIG. 4 is a schematic diagram showing a remote service system according to a second embodiment of the present invention.

A second embodiment shown in FIG. 4 is different from the first embodiment in that the fact that the vehicle has been sold to other user is confirmed by using the data recorded in a driver's license 12 in the form of an IC card. Specifically, the driver's license 12 of a vehicle is in the form of a non-contact IC card. A radio terminal 13 is provided on the remote service terminal 1 to operate as a card reader of the non-contact type. When the main key for the vehicle is turned on in a state where the driver holding the driver's license 12 is seated on the driver's seat of the vehicle, the data of the driver's license 12 (data including at least the name and address written on the driver's license) are read and are fed to the control unit 2 being linked to the turning on operation.

The user database 8 stores the data of the driver's license (i.e., data including at least the name and address) obtained from the driver's license 12. When the vehicle is to be used by a plurality of drivers in common, the data of driver's licenses obtained from the driver's licenses 12 of the plurality of drivers are all stored in the user database 8.

Figure 5:
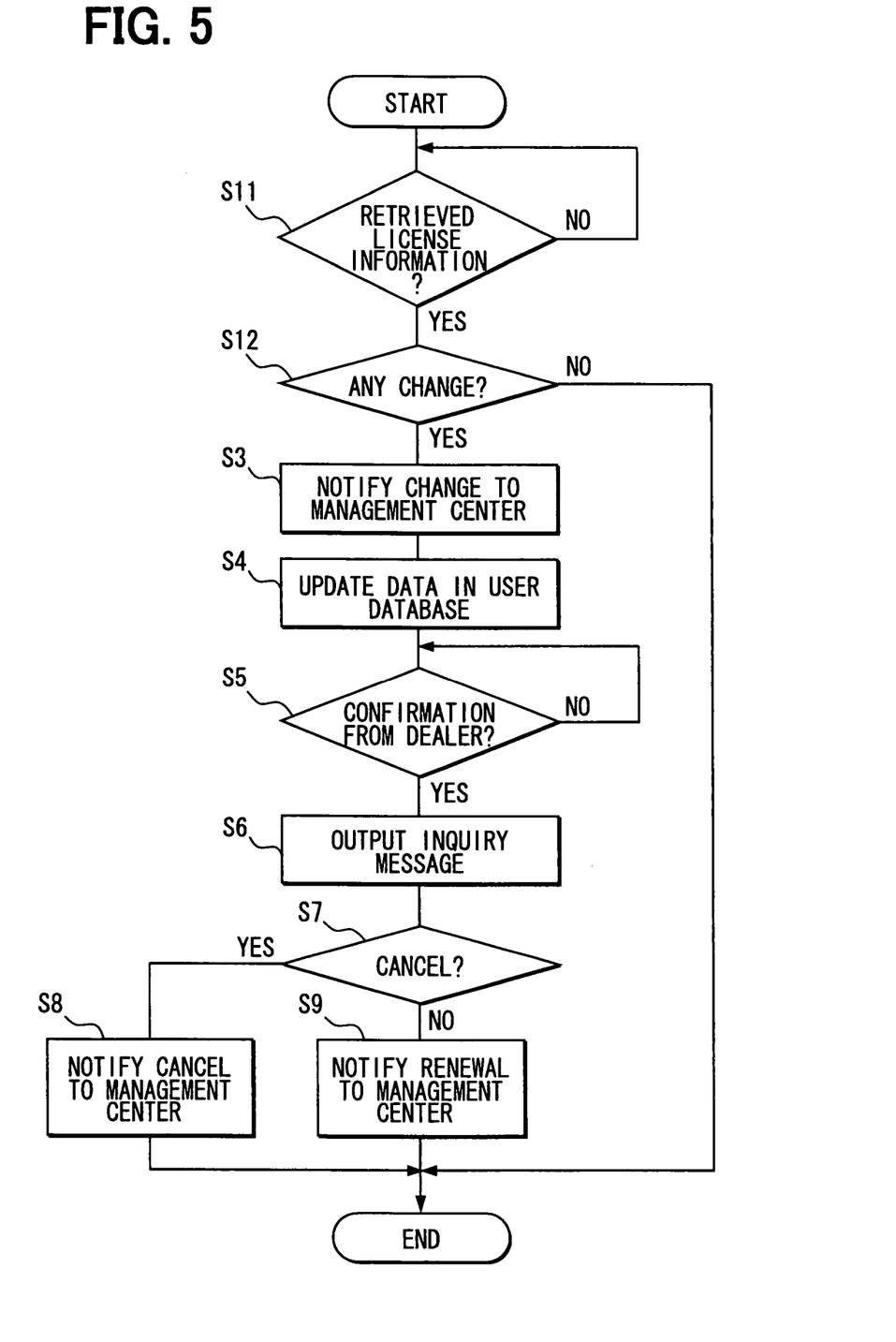
FIG. 5 is a flow diagram showing processing executed by a control unit of a remote service terminal in the second embodiment.

Referring to FIG. 5 showing the content of the processing for confirming the condition of the contract executed by the control unit 2 of the remote service terminal 1, it is checked if the data stored or recorded in the driver's license 12 (at least name and address) are retrieved by the radio terminal 13 (step S11). When the data of the driver's license are retrieved, i.e., when the data of the driver's license are read by the radio terminal 13 at timing when the main switch of the vehicle is turned on, the processing of next step S12 is executed.

At step S12, the retrieved data of the driver's license are compared with the data of the driver's licenses (the data of all driver's licenses when there are a plurality of driver's licenses) stored in the user database 8 to check if there is any difference in the newly retrieved data of the driver's license, particularly in the name. As a result of determination, if there is no difference in the data of the driver's license, the routine returns to the initial state. If there is a change, the processing is executed after step S3 in the similar manner as in the first embodiment.

Figure 6:
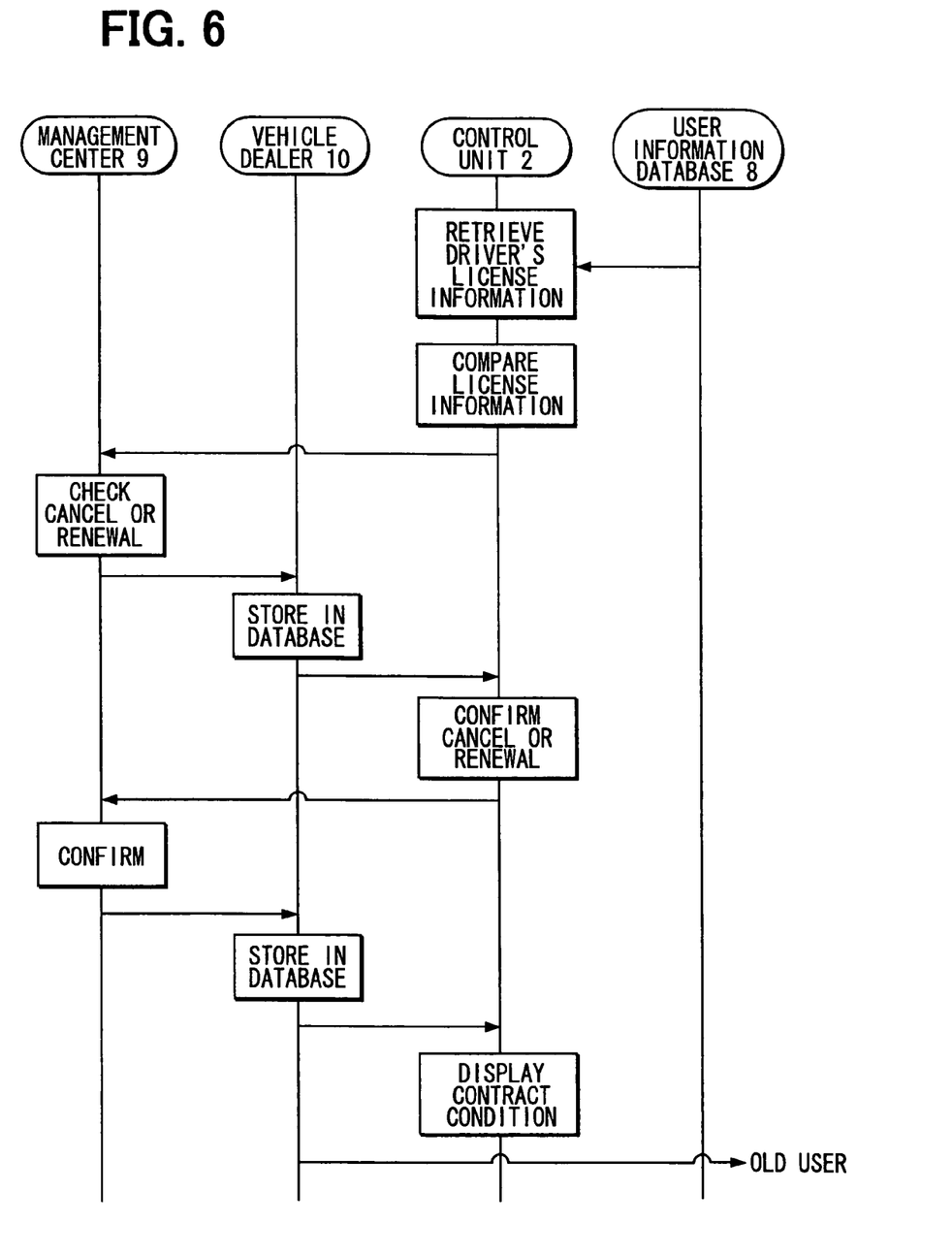
FIG. 6 is a sequence diagram showing flow of information among a management center, a vehicle dealer, a user information database and the remote service terminal in the second embodiment.

In the second embodiment, as shown in FIG. 6, data flow among the control unit 2, user database 8, management center 9 and vehicle dealer 10.

Third Embodiment

Figure 7:
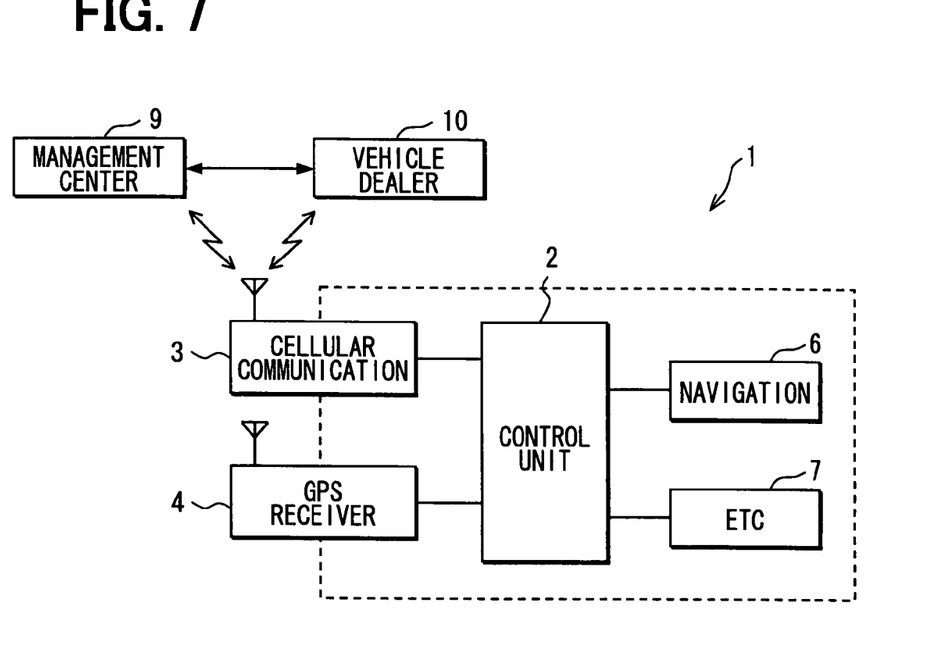
FIG. 7 is a schematic diagram showing a remote service system according to a third embodiment of the present invention.

A third embodiment is different from the first embodiment and the second embodiment in that the vehicle inspection certificate 11 equipped with the RFID tag or the driver's license 12 in the form of the non-contact IC card cannot be used. In this embodiment, as shown in FIG. 7, the remote service terminal 1 has no radio communication unit or user database.

Figure 8:
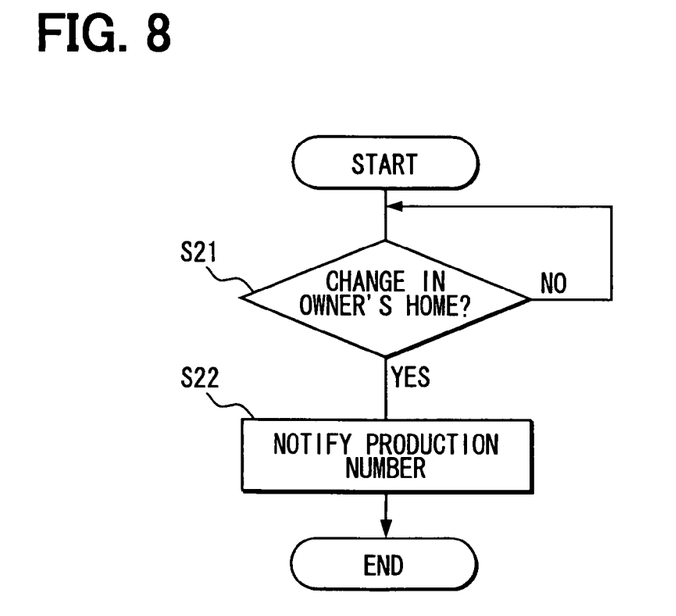
FIG. 8 is a flow diagram showing processing executed by a control unit of a remote service terminal in the third embodiment.

The control unit 2 therefore starts checking of the condition of the contract, as shown in FIG. 8, when the data related to the position of the owner's home is changed on the vehicle navigation unit 6 (step S21). After the start, specific data capable of specifying the remote service terminal 1, for example, production number information of DCM that constitutes the cellular communication unit 3 is notified to the management center 9 (step S22) and, thereafter, the routine returns to the initial state.

Figure 9:
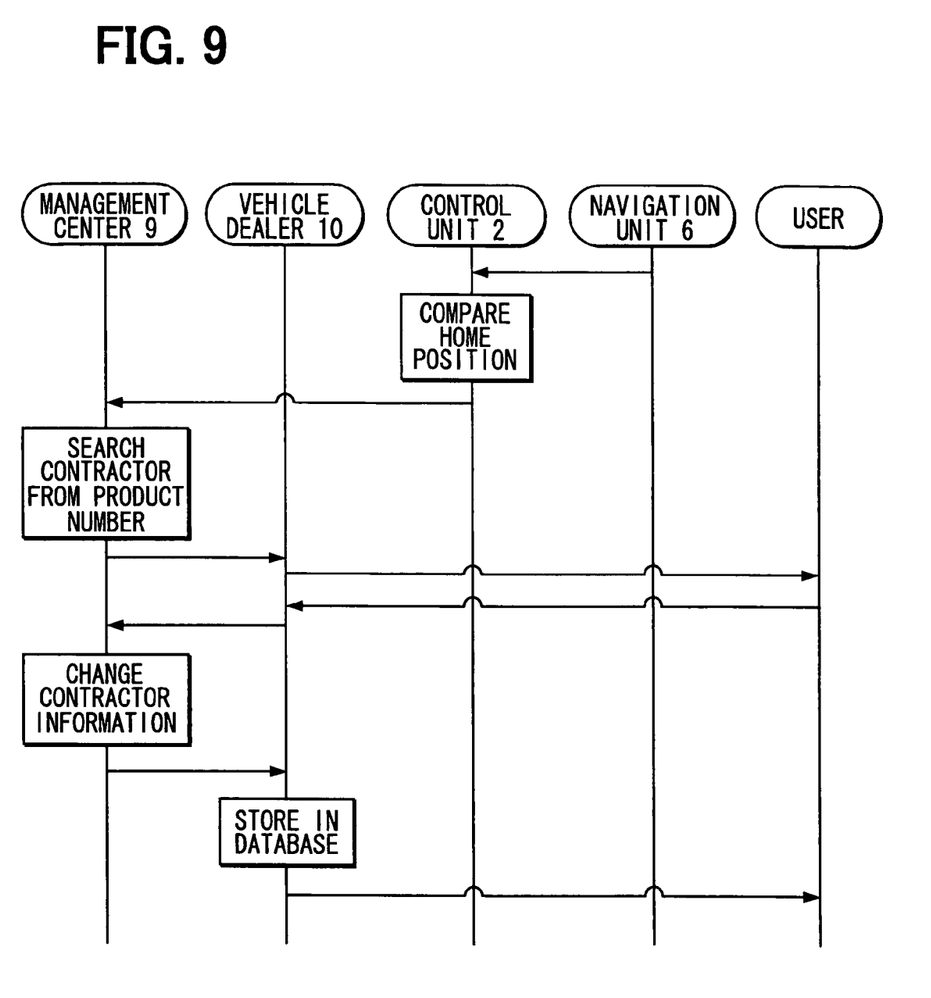
FIG. 9 is a sequence diagram showing flow of information among a management center, a vehicle dealer, a user information database and the remote service terminal in the third embodiment.

Referring to a sequence diagram of FIG. 9 which illustrates the flow of data among the control unit 2, vehicle navigation unit 6, management center 9, vehicle dealer 10 and the contracted user as well as the contents of processing in these units, upon receipt of the notice of data related to the production number from the remote service terminal 1 (control unit 2) on the vehicle side, the management center 9 retrieves the contractor database related to the remote services of the vehicle based on the data related to the production number to specify the contracted user corresponding to the data of the production number and notifies the data of the contractor (data inclusive of the name and address of the contractor) to the vehicle dealer 10 (as required, to inform the data of the production number, too).

The vehicle dealer 10 which receives the above notice sends a notice to the contracted user represented by the notified contractor data to confirm if the content of the contract of the remote services for the vehicle has been changed by sending an e-mail or by sending a rewritten document (and, as required, by a telephone). The contracted user who has received the notice of confirmation notifies a response stating that he wishes to cancel the contract of remote services for the vehicle when he abandons the vehicle or notifies a response stating that he wishes to take a procedure for changing the address when he simply changes the address (in this case, data of the new address must be included).

The vehicle dealer 10 that receives the notice of response transfers the notice of response to the management center 9. Upon receipt of the notice of response, the management center 9 changes the data of the contractor in the contractor database to a content that meets the notice of response. Specifically, when the notice of response is a wish for canceling the contract of remote services for the vehicle, the data of the contractor are changed into the cancelled state. Further, when the notice of response is a wish for changing the address, the address data in the contractor data are changed into the data of the new address in the notice of response.

After having effected the processing for changing the contractor data, the management center 9 notifies the results of change to the vehicle dealer 10. Upon receipt of the notice, the vehicle dealer 10 records the content of change in the contractor data related to the remote services for the vehicle in the database for managing the customers and informs the contracted user of the content of procedure corresponding to the content of change (procedure for canceling the contract or the procedure for changing the address), i.e., informs the contracted user of the completion of the procedure corresponding to the notice of response executed by the contracted user.

In short, according to the third embodiment, if the vehicle having the contract of using the services still valid is sold off without taking the procedure for canceling the contract of using services, the management center 9 specifies the user who has made the contract for using the services based on the data of the production number from which the remote service terminal 1 can be specified, and makes sure if the contracted user cancels the contract for using the services or simply changes the content of contract. Depending upon the result of confirmation, the contract for using the services is canceled or changed. Therefore, it does not happen that the new user who has newly owned the vehicle can use the remote services since the contract made by the old user is still valid, preventing in advance the occurrence of troubles between the new user and the old user due to resale of the vehicle having the remote service terminal 1 with the contract for using the services still valid. In particular, the remote service terminal 1 does not have to be provided with the radio communication unit 5 of the first embodiment or the radio terminal 13 of the second embodiment, providing advantage from the standpoint of lowering the cost of the device.

Other Embodiments

The above embodiments may be modified in many ways, for example, as described below.

In the above embodiments, the function for detecting the state where the owner of the vehicle having the remote service terminal 1 may have changed, is realized by utilizing the data read from the vehicle inspection certificate 1, data read from the driver's license 12, or data representing a change in the position of the owner's home on the vehicle navigation unit 6. However, the above function can be realized by utilizing the change in the registration of the ETC unit 7. Further, the control unit 2 may monitor the position where the vehicle is parked regularly and for extended periods of time based on the position data through the GPS receiver unit 4. When the regularly parking position has changed, it may be determined that the owner of the vehicle is likely to have changed.

In exchanging the data between the management center 9 and the remote service terminal 1 (or contracted user) in the above embodiments, predetermined data are exchanged through the vehicle dealer 10. However, the data may be exchanged as required, or the data may all be directly exchanged between the management center 9 and the remote service terminal 1.

What is claimed is:

1. A remote service system for vehicles comprising:
a remote service terminal mounted on a vehicle and having a communication function; and
a management center for providing predetermined remote services to the remote service terminal by communication, enabling the remote services to be used through only a contract made for using the services,
wherein the remote service terminal, for which the contract of using the services is still valid, is constructed to detect a state where an owner of the vehicle have changed and communicate a detected content to the management center when an owner change is detected, and
wherein the management center is constructed to access a contractor database accumulating data of contracted users of the services, confirm a change of the owner of the vehicle by retrieving a contractor database based on the detected content notified from the remote service terminal, inquire if the contract be canceled or if the name of the contractor is changed through the remote service terminal when the owner of the vehicle has changed, and cancel the contract or changes the name of the contractor based upon a response from the remote service terminal to an inquiry.

2. The remote service system according to claim 1, wherein when the remote service terminal detects the owner change, the management center qualifies an owner of the vehicle before the change to be an old user based on retrieval of the contractor database, notifies cancellation of the contract to the qualified old user, and cancels the contract.

3. The remote service system according to claim 2, wherein the management center inquires if the contract by the old user be cancelled prior to canceling the contract, and cancels the contract only when consent to canceling of the contract is provided from the old user in response to an inquiry.

4. A remote service system for vehicles comprising:
a remote service terminal mounted on a vehicle and having a communication function; and
a management center for providing predetermined remote services to the remote service terminal by communication, enabling the remote services to be used through only a contract made for using the services,
wherein the remote service terminal, for which the contract of using the services is still valid, is constructed to detect a state where an owner of the vehicle have changed and communicate specific information capable of specifying the remote service terminal to the management center when an owner change is detected, and
wherein the management center is constructed to access a contractor database accumulating data of contracted users for using the services, and specify the contracted user for using services related to the remote service terminal by searching the contractor database based on the specific data notified from the remote service terminal, inquire the specified contracted user if content of the contract is to be changed, and cancel or change the contract based upon a response from the contracted user in response to an inquiry.

* * * * *